3,072,701
CINNAMOHYDROXAMIC ACID DERIVATIVES
William Blythe Wright, Jr., Woodcliff Lake, and Robert Allis Hardy, Jr., Ridgewood, N.J., assignors to American Cyanamid Company, New York, N.Y., a corporation of Maine
No Drawing. Filed Aug. 24, 1961, Ser. No. 133,553
6 Claims. (Cl. 260—453)

This invention relates to certain novel hydroxamic acid derivatives and, more particularly, is concerned with novel compounds which may be represented by the following general formula:

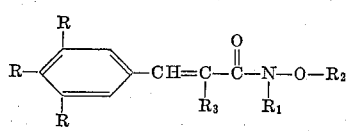

wherein R is lower alkoxy, $R_1$ is hydrogen, lower alkyl or lower alkenyl, $R_2$ is lower alkyl or lower alkenyl, and $R_3$ is hydrogen or lower alkyl. Suitable lower alkoxy substituents are methoxy and ethoxy. Suitable lower alkyl substituents are, for example, methyl, ethyl, n-propyl, isopropyl, etc. Suitable lower alkenyl substituents are, for example, allyl, propenyl, methallyl, etc.

The novel compounds of the present invention are, in general, white crystalline solids. They are generally insoluble in water, but relatively soluble in organic solvents such as lower alkanols, esters, ketones, benzene, toluene, chloroform, and the like.

The novel compounds of the present invention have useful pharmacological properties. They are central nervous system depressants of the tranquilizer type with very good activity at non-toxic doses, thereby demonstrating a favorable therapeutic index or margin of safety. They are effective tranquilizing or anti-anxiety agents at doses between about 50 and about 400 mg. per individual dose. The dosage regimen may be adjusted to provide the optimum thereapeutic response. For example, several doses may be administered daily, or the dose may be proportionately reduced as indicated by the exigencies of the therapeutic situation.

The novel compounds of the present invention may be readily prepared by the interaction of an alkoxyamine of the formula: $R_1$—NH—O—$R_2$, wherein $R_1$ and $R_2$ are as hereinabove defined, with a reactive derivative of a 3,4,5-trialkoxycinnamic acid such as the acid halide, acid anhydride, or ester.

The conversion of the 3,4,5-trialkoxycinnamic acids to the corresponding acid halides may be carried out by means of various reagents. For this purpose there may be used phosphorus trichloride, phosphorus tribromide, phosphorus pentachloride, phosphorus pentabromide, phosphorus oxychloride, sulfuryl chloride or thionyl chloride. However, we prefer to use thionyl chloride for the preparation of the corresponding intermediate acid chlorides. The reaction may be carried out at temperatures ranging from about 20° C. to about 100° C. in the absence of a solvent or in a solvent which will not enter into the reaction under the conditions employed. Such solvents may be, for example, chloroform, methylene chloride, benzene, and the like. The resulting acid halide is then treated with an appropriate alkoxyamine, as hereinabove defined, whereby the corresponding hydroxamic acid derivative is obtained. This reaction may be carried out at temperatures ranging from about 0° C. to about 100° C. For convenience, it is preferred to carry out the reaction in a solvent which will not enter into the reaction under the conditions employed. Solvents which may be used are, for example, chloroform, benzene, toluene, ether, tetrahydrofuran, and the like. An acid acceptor such as sodium hydroxide, sodium carbonate, or potassium carbonate may also be employed. In some cases the alkoxyamine may act as its own acid acceptor by employing a two-fold excess thereof.

The conversion of the 3,4,5-trialkoxycinnamic acids to the corresponding acid anhydrides may be readily achieved by the interaction of a 3,4,5-trialkoxycinnamic acid with its corresponding acid halide. The resulting acid anhydride is then treated with an appropriate alkoxyamine, as hereinabove defined, whereby the corresponding hydroxamic acid derivative is obtained. This reaction may be carried out at temperatures ranging from about 50° C. to about 100° C. Solvents which may be used are, for example, chloroform, toluene, tetrahydrofuran, and the like.

The lower alkyl esters of the 3,4,5-trialkoxycinnamic acids may be readily prepared by standard esterification procedures. The amidation of these intermediate esters may be brought about by treatment with an appropriate alkoxyamine under conditions well-known in the art. Alternatively, the novel compounds of the present invention may be prepared by O-alkylating an appropriate substituted hydroxamic acid as represented by the following general formula:

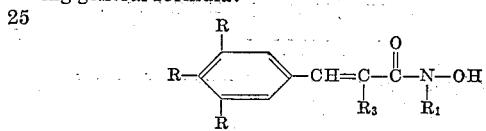

wherein R, $R_1$, and $R_3$ are as hereinbefore defined with a suitable alkylating agent. Suitable alkylating agents for O-alkylating the above defined intermediates are, for example, dimethyl sulfate, methyl iodide, ethyl bromide, and the like. This reaction may be carried out in an inert solvent such as ether, dioxane, tetrahydrofuran, and the like at temperatures ranging from about 0° C. to about 80° C.

The invention will be described in greater detail in conjunction with the following specific examples.

EXAMPLE 1

*O-Methyl-3,4,5-Trimethoxycinnamohydroxamic Acid*

A solution of 7.7 parts of 3,4,5-trimethoxycinnamoyl chloride in 50 parts of chloroform is added dropwise with stirring to a mixture of 2.5 parts of methoxyamine hydrochloride, 8.3 parts of potassium carbonate, 100 parts of water, and 50 parts of chloroform. The mixture is stirred at room temperature for 3 hours, after which the layers are separated. The chloroform layer is washed with saturated aqueous sodium chloride, and the washed chloroform solution is dried over anhydrous magnesium sulfate. The dried chloroform solution is concentrated under vacuum, and the residue is recrystallized from ethyl acetate to give O-methyl-3,4,5-trimethoxycinnamohydroxamic acid, M.P. 185–186° C.

EXAMPLE 2

*α,O-Dimethyl-3,4,5-Trimethoxycinnamohydroxamic Acid*

By replacing the 3,4,5-trimethoxycinnamoyl chloride employed in Example 1 by an equimolecular quantity of α-methyl-3,4,5-trimethoxycinnamoyl chloride and following substantially the same procedure described in Example 1, there is obtained α,O-dimethyl-3,4,5-trimethoxycinnamohydroxamic acid.

EXAMPLE 3

*O-Ethyl-3,4,5-Trimethoxycinnamohydroxamic Acid*

The procedure of Example 1 is repeated substituting an equimolecular amount of ethoxyamine hydrochloride for the methoxyamine hydrochloride employed in that example. There is thus obtained O-ethyl-3,4,5-trimethoxycinnamohydroxamic acid, M.P. 157–159° C.

EXAMPLE 4

*O-Methyl-3,4,5-Trimethoxycinnamohydroxamic Acid*

Example 1 is repeated but employing an equimolar amount of 3,4,5-trimethoxycinnamoyl chloride in place of the 3,4,5-trimethoxycinnamoyl chloride of that example. There is obtained the O-methyl-3,4,5-triethoxycinnamohydroxamic acid in equally good yield.

EXAMPLE 5

*O-Allyl-3,4,5-Trimethoxycinnamohydroxamic Acid*

In place of the methoxyamine hydrochloride of Example 1, there is employed an equimolar quantity of allyloxyamine hydrochloride whereby the O-allyl-3,4,5-trimethoxycinnamohydroxamic acid, M.P. 125–126° C., is obtained in equally good yield.

EXAMPLE 6

*O-Propyl-3,4,5-Trimethoxycinnamohydroxamic Acid*

By replacing the methoxyamine hydrochloride employed in Example 1 by an equimolecular quantity of n-propoxyamine hydrochloride and following substantially the same procedure described in Example 1, there is obtained O-propyl-3,4,5-trimethoxycinnamohydroxamic acid.

EXAMPLE 7

*O,N-Dimethyl-3,4,5-Trimethoxycinnamohydroxamic Acid*

The procedure of Example 1 is repeated substituting an equimolecular amount of O,N-dimethyl hydroxylamine hydrochloride for the methoxyamine hydrochloride employed in that example. There is thus obtained O,N-dimethyl-3,4,5-trimethoxycinnamohydroxamic acid, M.P. 102–104° C.

EXAMPLE 8

*O,N-Diallyl-3,4,5-Trimethoxycinnamohydroxamic Acid*

Example 1 is repeated but employing an equimolar amount of O,N-diallyl hydroxylamine hydrochloride in place of the methoxyamine hydrochloride of that example. There is obtained the O,N-diallyl-3,4,5-trimethoxycinnamohydroxamic acid in equally good yield.

What is claimed is:

1. A compound of the formula:

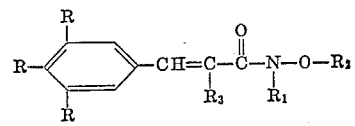

wherein R is lower alkoxy, $R_1$ is selected from the group consisting of hydrogen, lower alkyl and lower alkenyl, $R_2$ is selected from the group consisting of lower alkyl and lower alkenyl, and $R_3$ is selected from the group consisting of hydrogen and lower alkyl.

2. O-methyl-3,4,5-trimethoxycinnamohydroxamic acid.
3. α,O-dimethyl-3,4,5-trimethoxycinnamohydroxamic acid.
4. O-ethyl-3,4,5-trimethoxycinnamodroxamic acid.
5. O-allyl-3,4,5-trimethoxycinnamohydroamic acid.
6. O,N-dimethyl-3,4,5-trimethoxycinnamohydroxamic acid.

References Cited in the file of this patent

Kochet Kov et al.: Chem. Abs., vol. 53, pages 21783–4 (1959)